United States Patent
Poehlmann

[11] 3,917,213
[45] Nov. 4, 1975

[54] ADJUSTABLE TIEDOWN DEVICE
[75] Inventor: Paul W. Poehlmann, Stinson Beach, Calif.
[73] Assignee: H. Koch & Sons, Inc., Anaheim, Calif.
[22] Filed: June 3, 1974
[21] Appl. No.: 475,654

[52] U.S. Cl. ................................ 248/509; 105/485
[51] Int. Cl.² ........................................... B65J 1/22
[58] Field of Search ............ 248/502, 509; 105/485, 105/465, 366 B, 366 C

[56] References Cited
UNITED STATES PATENTS

| | | | |
|---|---|---|---|
| 2,729,418 | 1/1956 | Maynard | 248/509 X |
| 2,755,120 | 7/1956 | Young et al. | 105/366 C |
| 3,204,579 | 9/1965 | Burns et al. | 105/366 C |
| 3,486,787 | 12/1969 | Campbell | 105/366 C |
| 3,618,884 | 11/1971 | Wilson | 248/509 |
| 3,691,595 | 9/1972 | Backteman | 105/366 B UX |

*Primary Examiner*—J. Franklin Foss
*Attorney, Agent, or Firm*—George B. White

[57] ABSTRACT

The herein Tiedown Device includes an anchor stud which is particularly adapted for anchoring a serving cart, for instance, in an aircraft; the anchor stud is of substantially "T" shaped cross section which has a hollow stem and a head so that certain spaced anchor members on a cart can ride under and engage the head and thereby anchor the cart in position; a housing is secured in the floor, and a block is held in place by a diametrical crosspin; the hollow stem slides between the periphery of the block and the inner periphery of the housing and has therein a pair of longitudinal slots which ride on the crosspin; suitable stop is provided for limiting the outward movement of the hollow stem, thereby predetermining the distance to which the head of the anchor stud projects above the housing; a coil spring between the block and a shoulder in the hollow stem urges the hollow stem outwardly of the housing; a catch is spring-pressed into position to engage the crosspin to hold the stud in retracted position; and means are provided in the head of the anchor stud whereby the catch can be released from the crosspin at will so as to allow the coil spring to move the anchor stud out of the housing into anchoring position.

19 Claims, 18 Drawing Figures

ADJUSTABLE TIEDOWN DEVICE

BACKGROUND OF THE INVENTION

The use of tiedown devices is illustrated by U.S. Pat. No. 3,701,396 granted to Bruce F. House on Feb. 16, 1971, which shows an anchor stud which fixedly projects above the floor and therefore presents a continuous hazard. The primary object of the invention is to eliminate such hazard and to provide a tiedown device the anchor stud of which can be retracted into an out-of-the-way position and which can be easily and quickly released to a predetermined projecting position for the tiedown function.

Retracted anchors for other purposes were attempted previously, and the best examples known to applicant are the Maynard U.S. Pat. Nos. 2,729,417 and 2,729,418 granted in 1953, which are particularly adapted to form an anchorage to which a lashing or other securing means may be connected. However, the special problems which arise in connection with tying down a cart on the floor of an aircraft and allow facility of manipulation both for retracting and for projecting the same presented problems solved by the herein device.

DETAILED DESCRIPTION

Figure 1:
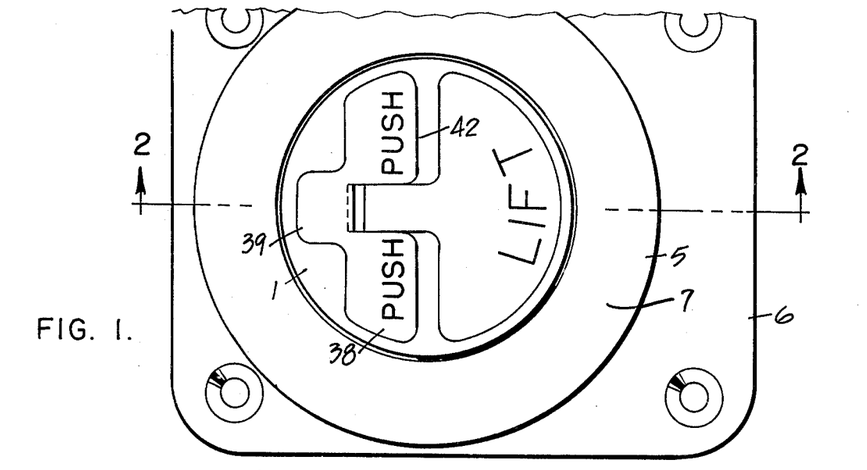
FIG. 1 is a cross-sectional view of the anchor stud device.
Figure 2:
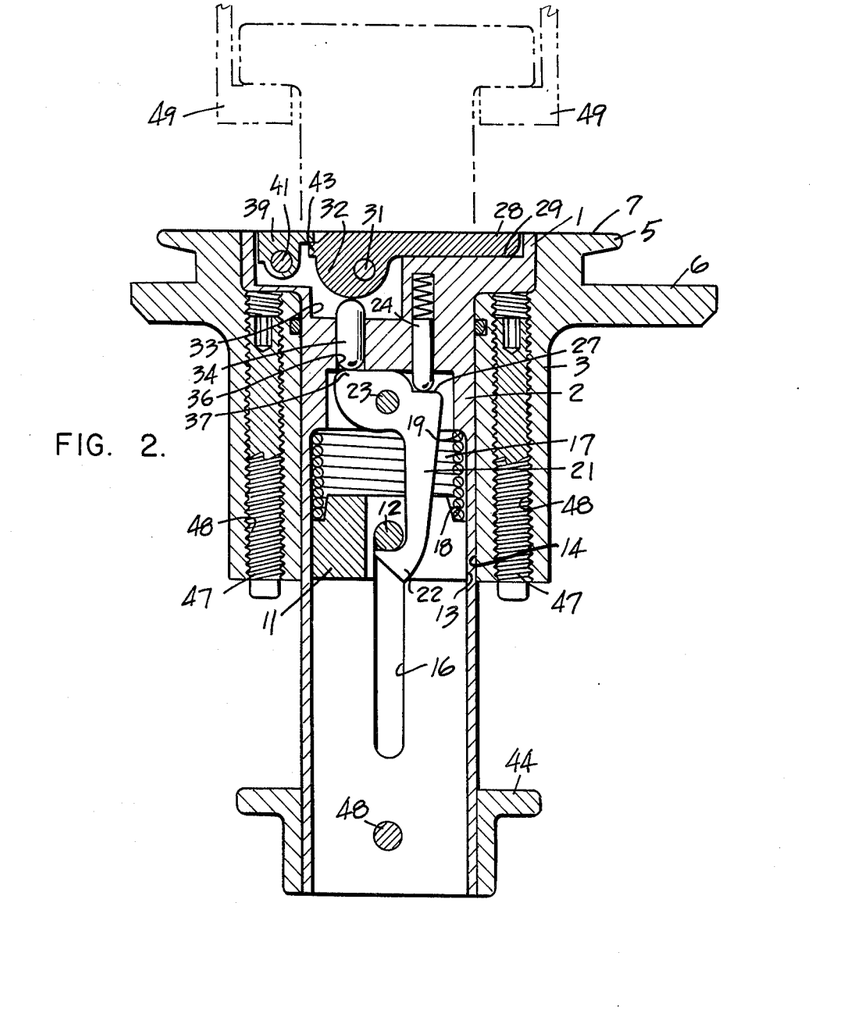
FIG. 2 is a top plan view of the device shown in FIG. 1
Figure 4:
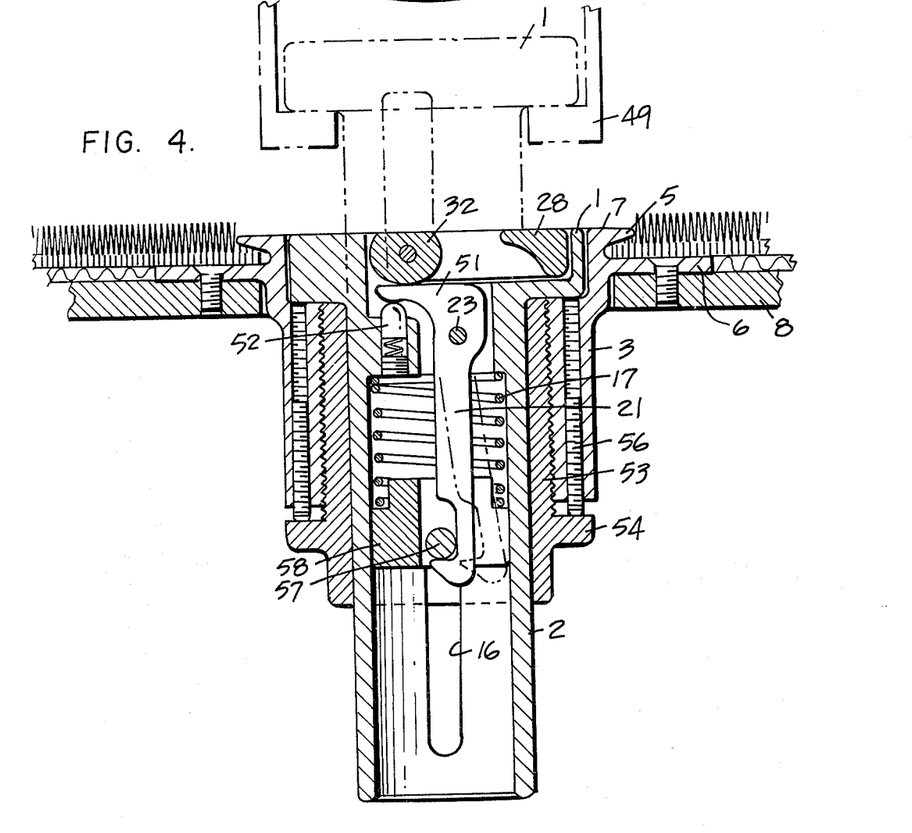
FIG. 4 is a cross-sectional view, the section being taken substantially on lines 4—4 of FIG. 3.

In the form shown in FIGS. 1 and 2 the anchor stud has a head 1 and a hollow stem 2. A housing 3 is adapted to be secured in a floor member by suitable fasteners through flanges 6 thereof. Upper flanges 5 are spaced from the flanges 6 of the housing so that while the flanges 6 rest on the floor 8 of the aircraft (as shown in FIG. 4), nevertheless the upper surface 7 is at the level of the usual carpet which covers the floor 8.

In the housing there is a guide block 11 which is held in a predetermined position by a crosspin 12, which latter extends diametrically across the housing 3 and has its ends secured in the housing. The outer periphery 13 of the guide block 11 is spaced from the inner periphery 14 of the housing so that the hollow stem 2 is slidable in the space between the block 11 and the housing 14. The hollow stem 2 has elongated slots 16 which ride on the crosspin 12, thereby to permit the reciprocation of the stem 2 from a retracted position and vice versa.

A coil spring 17 is positioned between an annular pocket 18 in the top of the block 11 and a shoulder 19 in the hollow stem 2 so that when the anchor stud is retracted, the spring 17 is compressed as shown in FIG. 1. A catch lever 21 has a hook 22 on its free end engaged with the crosspin 12 in the block 11. The lever 21 is held on a pivot 23 secured in the stem 2 and when hooked over the crosspin it prevents the compressed spring 17 from pushing the anchor stud out of the housing 3. A spring-pressed plunger 24 in a pocket 26 in the solid upper end of the stem 2 bears against a shoulder 27 of the catch lever 21 to urge the latter into locking position with the crosspin 12.

The release mechanism for the anchor stud includes a lever 28 nested in a recess 29 in the head 1 of the anchor bolt. A pivot 31 transverse in the recess 29 is in a cam 32 formed on the pivoted end of the lever 28 so that when the lever 28 is flat in the recess 29 the narrower part of the cam 32 is in the well 33 formed in the head 1 below said cam 32. Beneath the cam 32 is a link 34 slidable through a passage 36 in the solid upper portion of the stem 2 perpendicularly and bearing against a crank arm 37. So that when the lever 28 is lifted out of the recess 29 the rise of the cam 32 pushes the link 34 through the passage against the crank arm 37 thereby to swing the catch lever 21 around its pivot 23 and to disengage the hook 22 from the crosspin 12 and thus allow the compressed spring 17 to propel the stem 2 and head 1 upwardly projecting from the top of the housing 3.

A pivoted pedal 38 in the recess 29 straddles the cam 32 and is provided with a hub 39 on a pivot 41, so that the free edge 42 of the pedal 38 bears against a lug 43 projecting from the cam 32, whereby when the pedal 38 is pushed down it will turn the cam 32 and lift the lever 28 for the release of the catch lever 21 in the manner hereinbefore described.

The proper position of the head 1 of the anchor stud is predetermined by a stop flange 44 secured by a pin 48 on the inner end of the stem 2 so that it abuts against the inner ends of adjusting screws 47 projecting downwardly from the lower end of the housing 3. The proper position of the head 1 relatively to the top of the housing 7 is predetermined before the stem 2 is assembled by adjusting the screws 47 in their threaded holes 48 to the desired projection beyond the inner or lower end of the housing 3.

The broken lines in FIG. 1 above the lever of the housing 3 indicate the extended or projected position of the anchor stud. The anchor members 49 on the cart (not shown) are indicated in broken lines engaged with the shoulder of the head 1.

Figure 3:
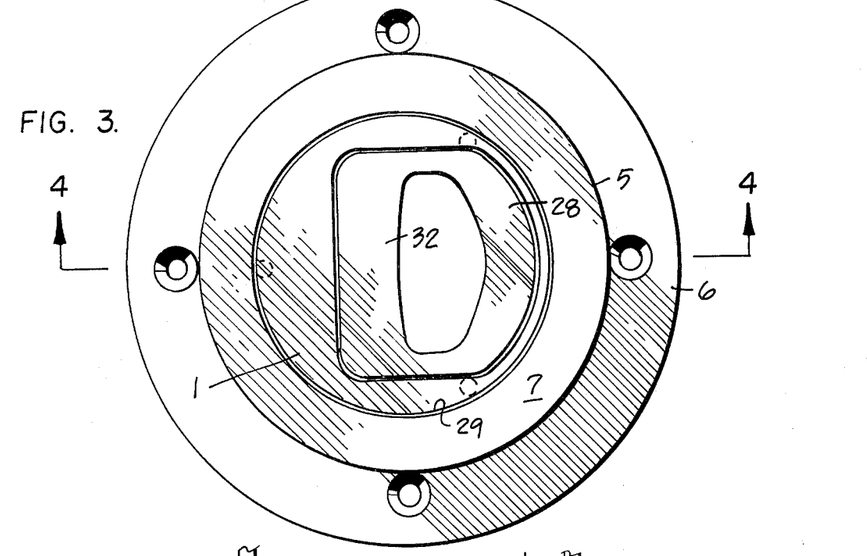
FIG. 3 is a top plan view of another form of the anchor stud.

The embodiment shown in FIGS. 3 and 4 has the same kind of anchor stud as heretofore described, but in this form the crank arm 51 of the catch lever 21 is directly engaged by the cam 32, and the spring-pressed plunger 52 in this embodiment is directed upwardly against the crank arm 51 thereby to urge the catch lever 21 into locking position. In this form the spacing of the mushroom head 1 of the anchor stud is predetermined by the length of the slots 16. The housing 3 in this form has a bushing sleeve threaded thereinto from its free end. An anchor flange 54 on the sleeve 53 bears against the positioning set screws 56. The crosspin 57 of this form extends through the block 58 and into the bushing sleeve 53, thus by the adjustment of the bushing sleeve 53 the location of the crosspin 57 can be predetermined.

Figures 5, 6:
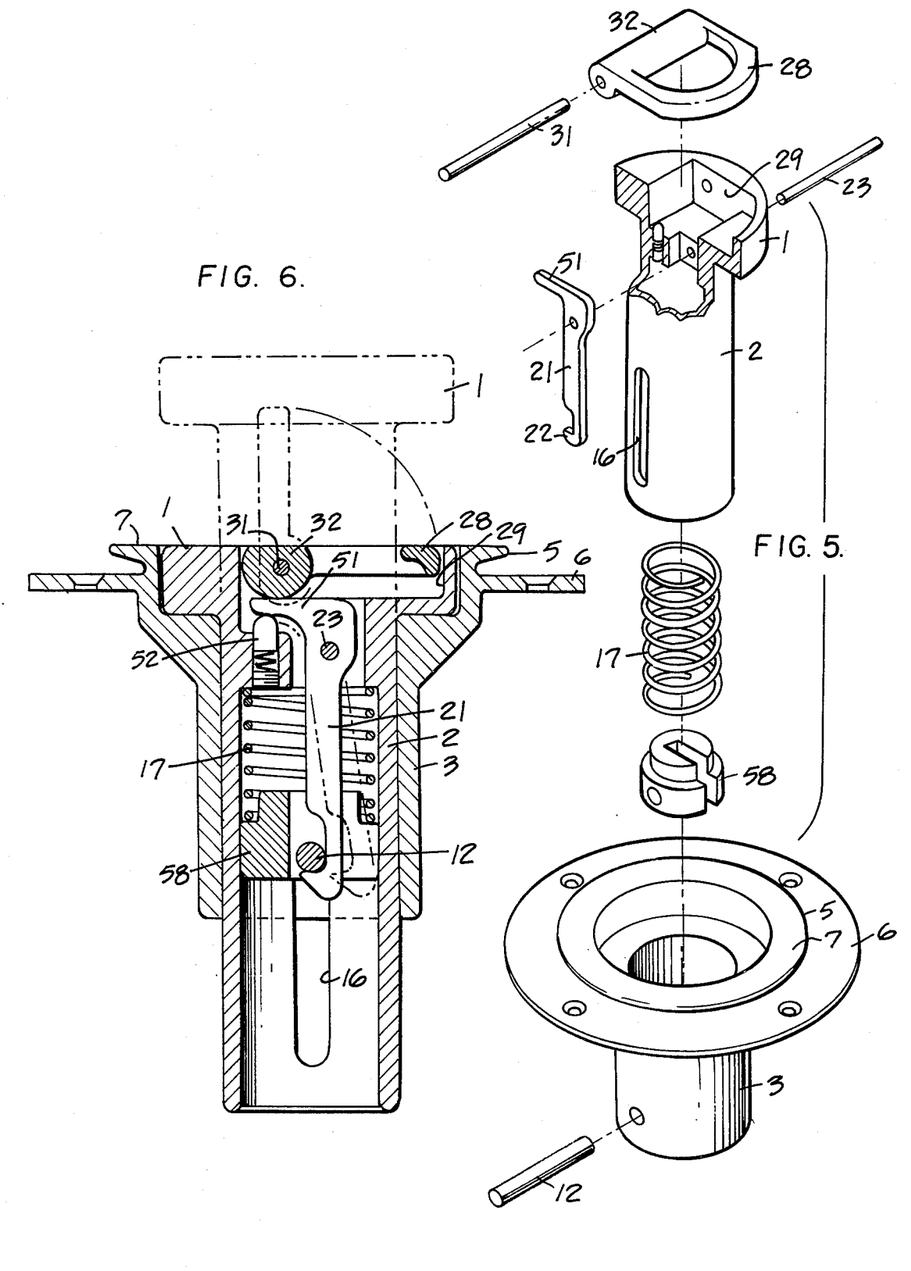
FIG. 5 is a developed view of another modified form of the device.
FIG. 6 is a cross-sectional view of said modified form.

The embodiment in FIGS. 5 and 6 is a simplified form of the anchor stud of the same type as in FIG. 4, but without the adjusting bushing sleeve. The developed view in the FIG. 5 illustrates the elements of the structure which in main are similar in the embodiment heretofore described. The liftable lever 28 in this embodiment is horseshoe shaped but it functions similarly to the lever 28 of FIG. 4.

The embodiments of the invention shown in FIGS. 7 to 18 inclusive utilize the principle of a torsion spring for the locking of the anchor stud.

Figure 7:
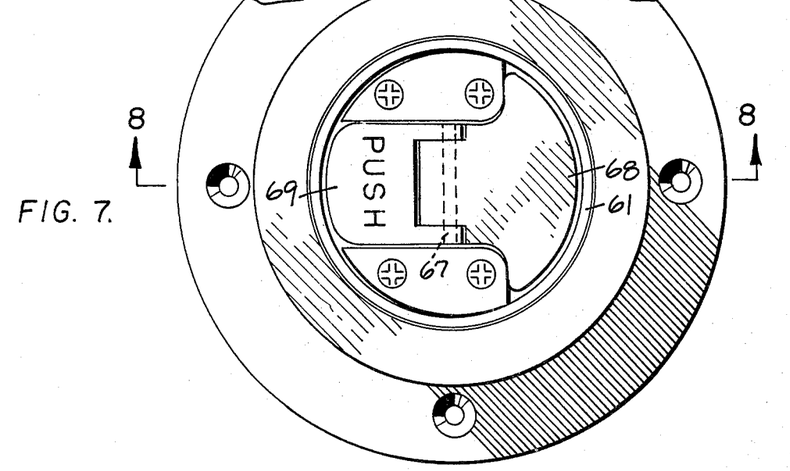
FIG. 7 is a top plan view of a second modified form of the device.
Figures 8, 9:
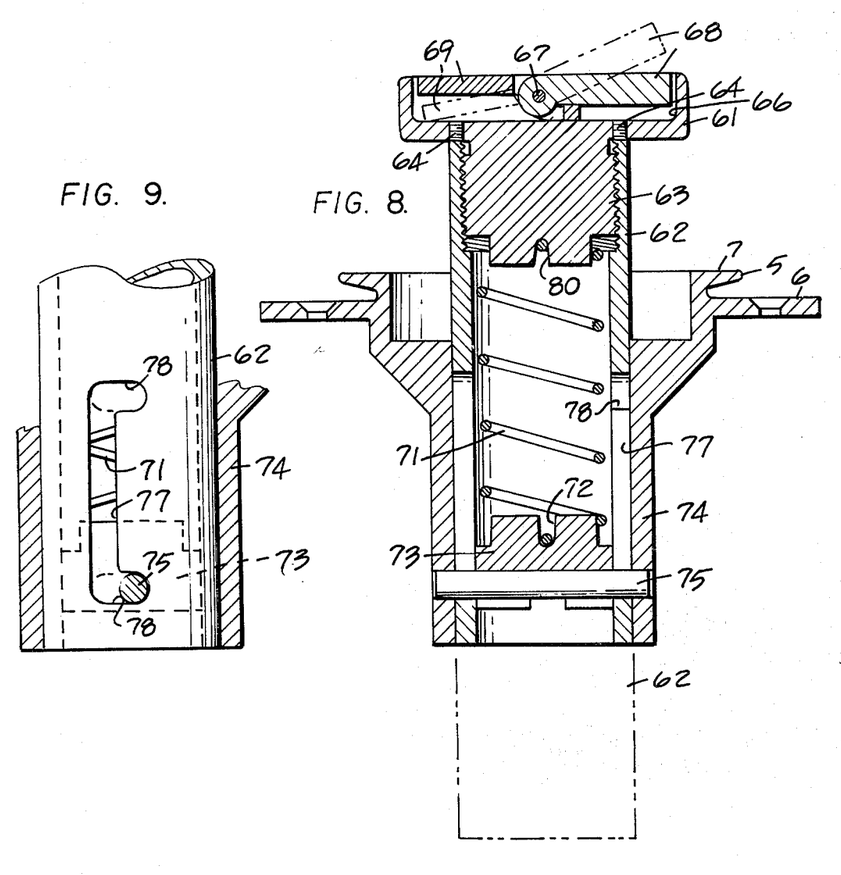
FIG. 8 is a cross-sectional view taken on lines 8—8 of FIG. 7.
FIG. 9 is a fragmental, partly sectional view of the guiding device for the hollow stem of the anchor stud of the device of FIG. 8.

In the form shown in FIGS. 7 to 9 the head 61 is formed with a threaded plug 63 screwed into the top of the hollow stem 62 and is held in place by suitable set screws 64. In the recess 66 of the head 61 are pivoted on a transverse pivot 67 a liftable lever arm 68 and a push lever arm 69 so that they can be moved into the broken line position shown in FIG. 8 and aid in applying of a turning force to the anchor stud. In this instance, the propelling force is a torsion spring 71, one end of which is anchored in a slot 72 in the top of the block 73, which latter is held in position in the housing 74 by the crosspin 75. The other end of the spring 71 is in a slot 80 in the inner end of the plug 63. In this embodiment the longitudinal slots 77 on the stem 62 are formed as bayonet slots 78 at each end thereof. The coil spring 71 is biased so that it turns the stem 62 so that the bayonet slot ends 78 engage the crosspin 75 at the respective ends of the slots 77 and hold the anchor stud either in the projected or in the retracted position.

Figures 10, 11, 12:
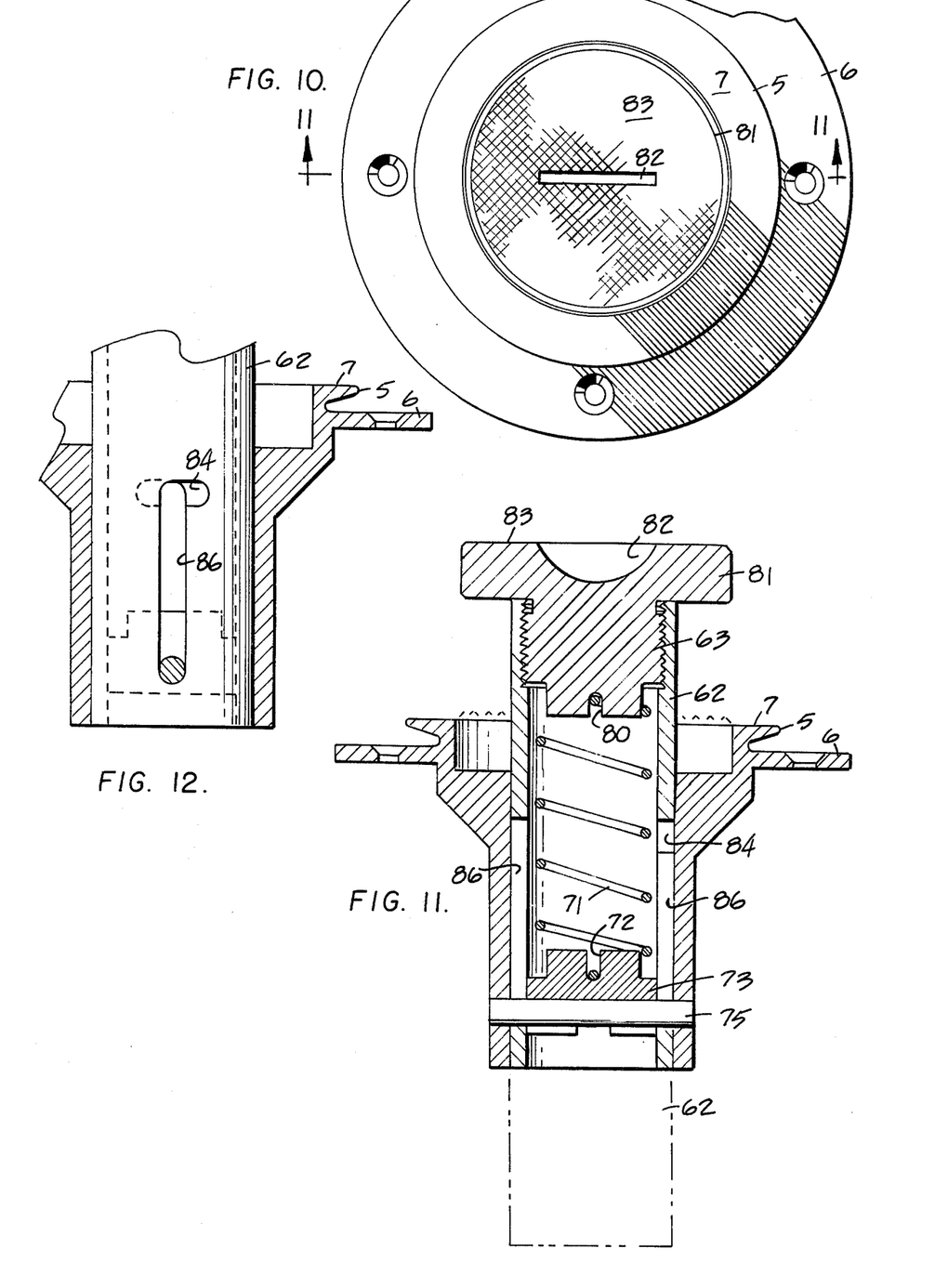
FIG. 10 is a top plan view of another modified form of the device.
FIG. 11 is a sectional view, the section being taken substantially on the lines 11—11 of FIG. 10.
FIG. 12 is a fragmental, partly sectional view of the guiding and locking means for the hollow stem of the anchor stud.

In another modified form, shown in FIGS. 10 to 12, inclusive, the elements and their operation are the same as in the form shown in FIGS. 7 to 9 inclusive, except that in the head 81 a transverse slot 82 is provided, and the exposed face 83 of the head 81 is knurled to facilitate engagement by the foot of a person for the turning of the head 81 and its stem, for disengagement of the bayonet end 84 of each slot 86 from the corsspin heretofore described. In this illustrative embodiment the bayonet slot 84 is provided in the upper end of the slot 86 so as to lock the hollow stem of the anchor stud in the retracted position.

In the embodiment shown in FIGS. 13 to 16 the flanges 91 of the housing 92 are on a single level and there is a recess or pocket 93 provided in the carpet 94 to allow the manipulation of the head 95 for the purpose of the turning required to release the bayonet slot 96 from the crosspin 97. In this form an elongated neck 98 connects the head 95 with the hollow stem 99 in the housing 92.

Figures 13, 14, 15, 16:
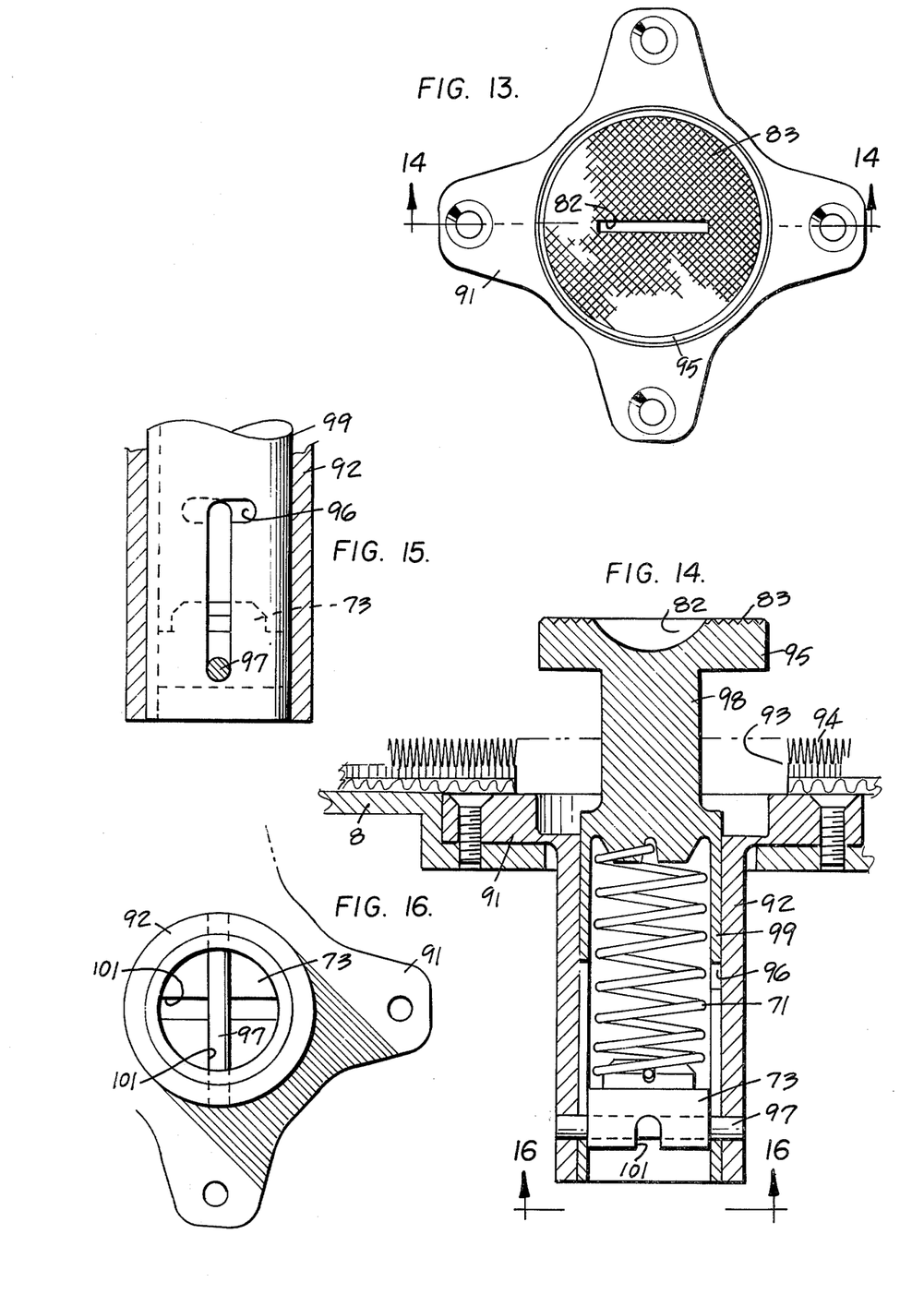
FIG. 13 is a plan view of another form of the anchor device.
FIG. 14 is a sectional view taken substantially on lines 14—14 of FIG. 13.
FIG. 15 is a partly sectional fragmental detail, showing the locking and guiding means for the hollow stem of the anchor stud.
FIG. 16 is a sectional view taken on lines 16—16 of FIG. 14.

FIG. 16 shows the lower face of the block 73, which is identical in all the forms from FIG. 7 to FIG. 16. Namely, the slots 101 in the bottom of each block 73 are cross slots for adjusting the tension of the torsion spring 71 by lifting the block 73 off the respective crosspin, thereby allowing the turning of the block 73 into the next cross slot 101 and so on, for the purpose of tightening or loosening of the tension of the torsion spring 71.

Figure 17:
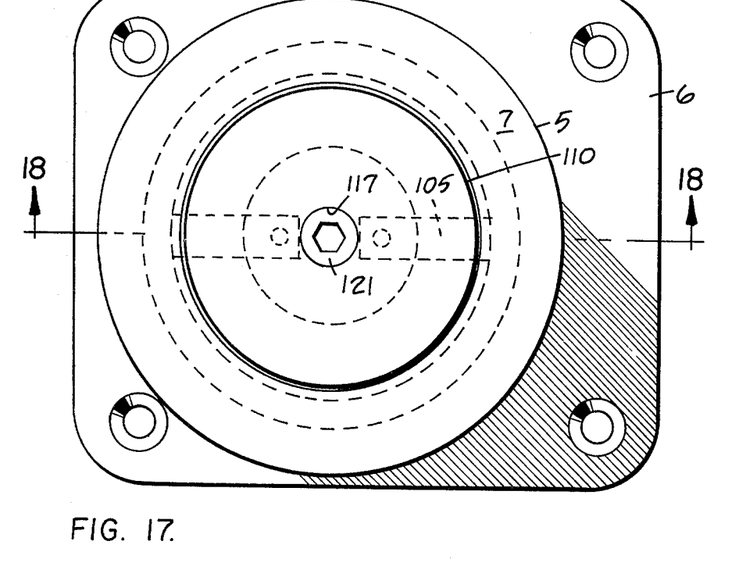
FIG. 17 is a plan view of a modified form for adjustment of the anchor stud.
Figure 18:
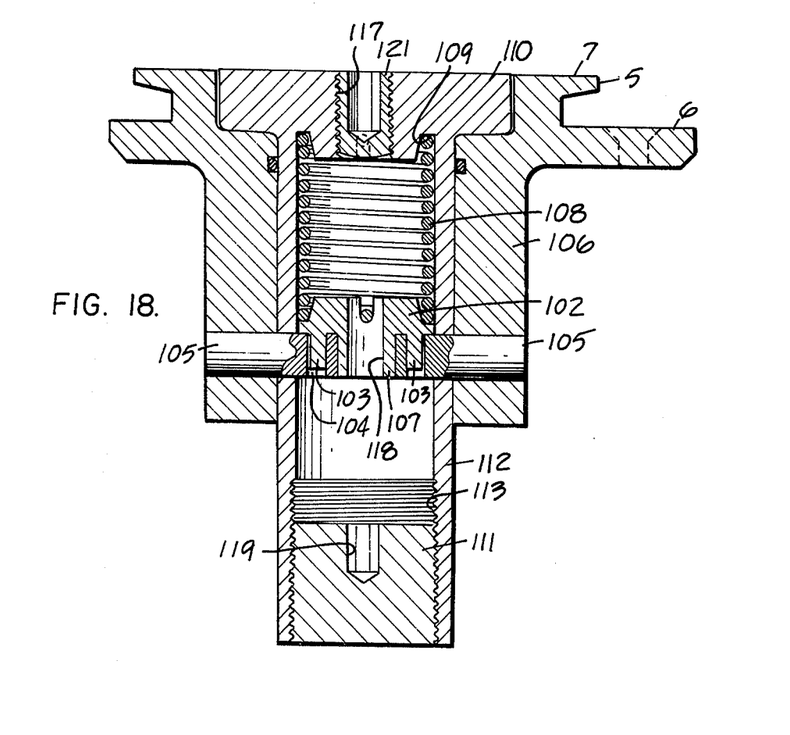
FIG. 18 is a sectional view, section being taken on lines 18—18 of FIG. 17.

In the embodiment shown in FIGS. 17 and 18 the spring backing block 102 is held in place by prongs 103 projecting into holes 104 near the inner ends of pins 105 extending from opposite sides of the housing 106. A hub 107 projects between the inner ends of the pins 105. The torsion spring 108 is anchored in a groove 109 under the head 110 of the anchor stud. A limiting plug 111 is threaded into the inner end of the stem 112 of the anchor stud. The threads 113 extend beyond the inner ends of the guide slots. By adjusting the plug 111 the stroke of the stem 112 is limited to the desired position of the head 110. In order to permit adjustment of the projected position of the anchor stud, an access hole 117 is provided through the head 110, and a hole 118 through the block 102 permits access to a socket 119 in the plug 111 so that a long Allen wrench can be inserted for turning the limit plug 111 to the desired position. The hole 117 in the head 110 is normally covered by a screw plug 121 for the usual operation by an Allen wrench for insertion and removal.

The guide slots are the same type as shown in FIG. 9 hereinabove described. FIG. 18 shows the stem 112 turned into locking engagement with the pins 105.

In all the forms of the invention the floor 8 may be a floor plate on which the housing is preassembled and then the floor plate in turn is secured onto the floor board of the aircraft.

I claim:
1. In a tiedown device,
an anchor stud having a head and a hollow stem, said head being adapted to be engaged by a member to be tied down,
a housing,
a backing member in said hollow stem,
securing means to secure said backing member to said housing so that said backing member is spaced from said housing and said hollow stem is movable between said backing member and said housing,
coacting guide means between said stem and said securing means to guide said stem in axial movement relatively to said housing,
resilient means bearing against said backing member and against said stem to urge said anchor stud outwardly from said housing,
means to limit the axial outward movement of said anchor stud, thereby to predetermine the position of said head for engagement by the member to be tied down,
releasable means to lock said anchor stud in retracted position in said housing,
and means to release said releasable locking means at will,
said resilient means being a spring located within said hollow stem,
said securing means including a securing element extended across said housing in engagement with said backing member and being secured to said housing, said coacting guide means including guide slots in said hollow stem riding over said securing element between said backing member and said housing during movement of the stem into and out of said housing.

2. The tiedown device specified in claim 1, and
said releasable locking means including
a hook member pivotally connected to said hollow stem and adapted to be hooked to said backing member thereby to hold said anchor stud in retracted position.

3. The tiedown device specified in claim 2, and
said releasing means including
a movable element mounted on said head,
and connecting means to connect said movable element to said hook for moving said hook out of engagement from said backing member upon the movement of said movable element.

4. The tiedown device specified in claim 2, and
said releasing means including
an arm on said pivoted hook, and
a device in said head accessible for exerting force on said arm to turn said hook out of engagement from said backing member.

5. The tiedown device specified in claim 2, and
said releasing means including an accessible lever pivoted in said head, and
an abutment element on the pivoted end of said lever abutting against said pivoted hook so as to turn said hook out of engagement from said backing member when said lever is moved from an initial position into releasing position, and
resilient means in said anchor stud to urge said hook into engagement with said backing member.

6. The tiedown device specified in claim 5, and
said backing member having a cavity therein adjacent said securing element extended across said stem for accommodating said pivoted hook for engagement with said securing element in said backing member.

7. The tiedown device specified in claim 1, and
said means to limit the axial outward movement of said anchor stud including
a support axially adjustable in said housing between said stem and said housing,
said securing means to secure said backing member being connected to said adjustable support so that said hollow stem is movable between said backing member and said adjustable support thereby to predetermine the released position of said anchor stud relatively to said housing.

8. The tiedown device specified in claim 2, and a eeve axially adjustably secured to the inner periphery f said housing,
said securing element being secured to said sleeve, and said hollow stem being slidable between said sleeve and said backing member thereby to adjust the position of said anchor stud relatively to said housing.

9. The tiedown device specified in claim 1, and
said backing member being a block within said hollow stem,
said housing including a sleeve threaded into said housing inwardly from the inner end thereof,
said securing means to secure said backing member to said housing being a crosspin secured to said sleeve,
said resilient means being a spring in said hollow stem between said block and said head,
said coacting guide means including longitudinal slots in said hollow stem riding upon said pin between said block and said sleeve.

10. The tiedown device specified in claim 9, and
said releasable locking means including a hook pivoted in said hollow stem,
said crosspin extending through said block and said block having a cavity therein adjacent said crosspin to accommodate the engagement of said hook with said crosspin,
a device accessible in said head and engageable with said hook so as to turn said hook out of engagement from said pin,
and resilient means to urge said hook into engagement with said pin.

11. The tiedown specified in claim 9, and
an outwardly extending flange on said sleeve, and
adjustable limiting members extending from said housing towards said flange for limiting the adjustment of said sleeve outwardly of said housing.

12. The tiedown device specified in claim 8, and
said device in said head including
a pivoted lever,
an abutment on the pivoted end of said lever,
said hook having a crank arm in engagement with said abutment whereby when said lever is moved from its initial position into releasing position said abutment bears on said arm for turning said hook out of engagement from said pin.

13. The tiedown device specified in claim 1, and
said resilient means being a torsion spring anchored within said hollow stem on said backing member, and being biased for urging the turning of the anchor stud in one direction,
said coacting guide means including bayonet slots in said hollow stem riding over said securing means, each bayonet slot being longitudinal on the stem and having at least one bayonet extension at an angle opposite to the direction of bias of said tension spring.

14. The tiedown device specified in claim 13, and
said securing means to secure said backing member to said housing being a pin secured to said backing member and to said housing,
said backing member having at least a pair of diametrical slots in the part thereof adjacent said pin, each of said slots being adapted to nest on said pin, thereby to permit the adjustment of the tension of said spring by turning said backing member together with the anchored end of said tension spring anchored thereon for engagement with the diametrical slots in sequence.

15. The tiedown device specified in claim 14, and
said angular portion of said guide slot being engageable with said pin in the retracted position of the anchor stud.

16. The tiedown device specified in claim 15, and
each of said slots having at least a pair of bayonet extensions in a direction opposite to the bias of said coil spring, one of said bayonet extensions being engageable with said pin in the retracted position of said anchor stud and the other bayonet extension being engageable with said pin in the extended position of said anchor stud.

17. The tiedown device specified in claim 14, and means on the head of said stud engageable for turning said stud for disengaging said bayonet extension from said pin.

18. The tiedown device specified in claim 13, and said means to limit the axial outward movement of said anchor stud including
a limit plug adjustably secured in the free end of said hollow stem,
and means to adjust said limit plug axially relatively to said slots for determining the stroke of travel of said stem relatively to said housing.

19. The tiedown device specified in claim 13, and said means to limit the axial outward movement of said anchor stud including
a limit plug threaded into the free end of said stem,
said head and said backing member having registering apertures therethrough for the insertion of a tool for turning said threaded plug thereby adjusting the effective lengths of said slots.

\* \* \* \* \*